US007830484B2

(12) United States Patent
Eom et al.

(10) Patent No.: US 7,830,484 B2
(45) Date of Patent: Nov. 9, 2010

(54) TFT ARRAY SUBSTRATE FOR INSPECTION AND METHOD FOR INSPECTION USING THE SAME

(75) Inventors: Soung Yeoul Eom, Gumi-si (KR); Dong Woo Kang, Gumi-si (KR); Bong Chul Kim, Daegu (KR); Ki Soub Yang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 669 days.

(21) Appl. No.: 11/449,783

(22) Filed: Jun. 9, 2006

(65) Prior Publication Data

US 2007/0052896 A1 Mar. 8, 2007

(30) Foreign Application Priority Data

Aug. 30, 2005 (KR) ..................... 10-2005-0080150

(51) Int. Cl.
*G02F 1/1343* (2006.01)
*G02R 31/00* (2006.01)

(52) U.S. Cl. ........................ 349/139; 349/141; 324/770

(58) Field of Classification Search ................. 349/139, 349/141; 324/770
See application file for complete search history.

(56) References Cited

U.S. PATENT DOCUMENTS 5,734,450 A * 3/1998 Irie et al. ...................... 349/39
2002/0027621 A1* 3/2002 Chae .......................... 349/40

* cited by examiner

*Primary Examiner*—David Nelms
*Assistant Examiner*—Lauren Nguyen
(74) *Attorney, Agent, or Firm*—McKenna Long & Aldridge LLP

(57) ABSTRACT

A TFT substrate for inspection for shorts, includes a substrate defined by a display area and a non-display area outside the display area; a plurality of first and second lines formed in the display area on the substrate; pad lines formed to be extended from one side of each of the first lines to the non-display area; a plurality of signal inspection bars formed in the non-display area to cross the pad lines at one side of the pad lines; a shorting inspection bar spaced apart from the outermost signal inspection bar at a predetermined interval and substantially parallel with the signal inspection bar and connected to the pad lines; and a plurality of transparent electrode patterns partially overlapped with the pad lines and connected to one of the signal inspection bars.

6 Claims, 10 Drawing Sheets

TFT ARRAY SUBSTRATE FOR INSPECTION AND METHOD FOR INSPECTION USING THE SAME

This application claims the benefit of Korean Patent Application No. P2005-80150, filed on Aug. 30, 2005, which is hereby incorporated by reference for all purposes as if fully set forth herein.

BACKGROUND OF THE INVENTION

1. Field of the Invention

The present invention relates to a liquid crystal display (LCD) device, and more particularly, to a thin film transistor (TFT) substrate for inspecting shorts between gate lines and common lines and an inspection method using the same.

2. Discussion of the Related Art

There has been increasing demand for a variety of display devices with the development of an information society. Accordingly, many efforts have been made to research and develop a variety of flat display devices such as the liquid crystal display (LCD), the plasma display panel (PDP), the electroluminescent display (ELD), and the vacuum fluorescent display (VFD). These flat display devices used as the displays for a variety of equipment.

Among the various flat display devices, liquid crystal display (LCD) devices are widely used because of their thin profile, light weight, and low power consumption. LCD devices have been substituted for Cathode Ray Tube (CRT) displays. In addition to mobile applications such as displays for notebook computers, LCD devices have been deployed as computer monitors and as the displays of televisions that receive and display broadcasting signals.

A typical LCD device includes a liquid crystal panel for displaying images and a driver for applying signals to the liquid crystal panel. The liquid crystal panel includes first and second glass substrates bonded to each other with a predetermined space maintained between the substrates, and a liquid crystal layer formed between the first and second glass substrates. The liquid crystal layer may be formed by injection of liquid crystal between the bonded substrates.

The first glass substrate (TFT array substrate) includes a plurality of gate lines arranged along a first direction at fixed intervals; a plurality of data lines arranged along a second direction perpendicular to the first direction at fixed intervals crossing the gate lines; a plurality of matrix type pixel electrodes formed in pixel regions defined by the crossing gate and data lines; and a plurality of TFTs each connected to a respective pixel electrode and switched by signals on the gate lines to transfer signals on the data lines to the respective pixel electrodes.

The process of forming the TFTs is referred to as the TFT array process.

The second glass substrate includes a black matrix layer for shielding light from portions other than the pixel regions; R/G/B color filter layers for displaying various colors; and a common electrode for generating an electric field for producing an image.

The predetermined space is maintained between the first and second glass substrates by a spacer, and the first and second substrates are bonded to each other by a sealant. A liquid crystal layer is formed between the first and second substrates. The sealant may have a liquid crystal injection hole allowing liquid crystal to be injected between the two substrates after the substrates are bonded to each other.

The operating principle of the LCD device is based on optical anisotropy of the polarizing properties of the liquid crystal. Liquid crystal molecules have a long thin shape and when aligned in a common direction, the liquid crystal displays directional polarization characteristics. By applying an electric field to the liquid crystal, the alignment direction of the liquid crystal molecules may be controlled. When the alignment direction of the liquid crystal molecules is changed, the light polarization changes due to the optical anisotropy of the liquid crystal. This principle may be used to display an image.

The above-described LCD device is referred to as a twisted nematic (TN) mode LCD device. TN mode devices have disadvantageous characteristics including a narrow viewing angle. In-plane switching (IPS) mode LCD devices have been developed as a solution to the narrow angle viewing problem.

In the IPS mode LCD device, a pixel electrode and a common electrode are formed in a pixel region of a first substrate in parallel with each other at a fixed interval, so that an IPS mode electric field (that is a horizontal electric field) may be generated between the pixel electrode and the common electrode. The IPS mode electric field aligns the liquid crystal layer in a horizontal direction corresponding to the direction of the IPS mode electric field.

The driver for applying a driving signal to the liquid crystal panel is formed as a drive integrated circuits (ICs) connected to each pad of the gate and data lines.

A gate drive IC sequentially supplies scan signals to the gate lines so that lines of pixels arranged in a matrix arrangement and parallel to the gate lines are sequentially selected. Data signals are supplied from the data drive IC to the selected pixels.

Hereinafter, a related art LCD device will be described with reference FIGS. 1 and 2 of the accompanying drawings.

FIG. 1 is a plane view illustrating one pixel of a related art IPS mode LCD device, and FIG. 2 is a plane view illustrating gate lines, common lines and signal applying sides of the related art IPS mode LCD device.

As shown in FIG. 1, the related art IPS mode LCD device includes a plurality of gate lines 11 and a plurality of data lines 12 formed on a first substrate 10. The gate lines 11 are arranged to perpendicularly cross the data lines 12. A plurality of pixel regions is defined by the gate and data lines 11 and 12. A plurality of TFTs is formed with each TFT near the crossings of the gate lines 11 the data lines 12. A plurality of pixel electrodes 13 and a plurality of common electrodes 15*a* are alternately formed within the pixel regions.

Each of the TFTs includes a gate electrode 11*a* extended from the gate lines 11, a source electrode 12*a* extended from the data lines 12, and a drain electrode 12*b* spaced apart from the source electrode 12*a* at a predetermined interval. Each of the TFTs further includes a semiconductor layer 14 formed below the source and drain electrodes 12*a* and 12*b* to cover the gate electrode 11*a*.

Furthermore, a gate insulating layer (not shown) is formed on the entire surface of the first substrate 10 including the gate line 11, and a passivation layer (not shown) is formed on the gate insulating layer. The passivation layer above a predetermined portion of the drain electrode 12*b* is exposed to define a passivation hole (not shown). The pixel electrode 13 is connected to the drain electrode 12*b* through the passivation hole. The gate insulating layer and the passivation layer are formed of inorganic insulating material and deposited at a thickness of 2000 Å to 4000 Å.

The common electrodes 15*a* extend from common lines 15 parallel to the gate lines 11. The common electrodes 15*a* are alternated with the pixel electrodes 13.

The second substrate (not shown) is arranged opposite the first substrate 10 and includes a black matrix layer (not shown) that shields non-pixel regions (gate lines 11, data lines 12 and TFTs); R/G/B color filter layers formed on the color filter substrate (not shown) including the black matrix layer to correspond to the pixel regions, and an overcoat layer formed on the entire surface of the second substrate including the color filter layers.

As shown in FIG. 2, in the IPS mode LCD device of the related art, a plurality of gate lines 11 are formed on the first substrate 10 at constant intervals, and common lines 15 are formed in parallel with the gate lines 11 to correspond to the respective gate lines 11. Since the common lines 15 are formed within a small pitch between two adjacent gate lines 11, a gate line 11 may contact a common line 15 causing a short.

A display area (dotted line area) and a non-display area outside the display area are defined on the substrate 10. The gate lines 11 are formed in the display area and are extended to the non-display area at one side to connect to respective gate pad lines. The common lines 15 are partially extended to the non-display area at the other side, and are electrically connected to common vertical lines perpendicular to the common lines 15. A common voltage applied to the common vertical lines is commonly applied to the common lines.

Although not shown, the data lines are extended to the non-display area to connect to the data pads.

However, the related art IPS mode LCD device has several problems.

In the related art IPS mode LCD device, the plurality of gate lines are formed at predetermined intervals and the common lines are formed between adjacent gate lines. Because the distance between the common lines and the gate lines is very narrow, shorts (unintended electrical connection) between the gate lines and adjacent common lines may occur in the process of forming the common lines and the gate lines. Such shorts may result in a rework process being performed on 30 to 50% of IPS mode LCD devices after the array process. Since shorts between the gate lines and adjacent common lines directly affect yield, a process for inspection of short is performed.

In an inspection process for a related art LCD device to detect shorts between the gate lines or the data lines, the gate lines or the data lines are divided into odd numbered lines and even numbered lines. The odd numbered lines are connected together at one side with a first shorting bar, the even numbered lines are connected together at one side with a second shorting bar, and different voltages are applied to the first and second shorting bars. Voltage values are measured at the sides of the odd numbered lines and the even numbered lines opposite to the shorting bars. The measured voltage values are then compared with the applied voltages to inspect whether adjacent lines are in contact with each other.

However, the above described shorting bar inspection method cannot be used to detect shorts between the gate lines and the common lines in an IPS mode LCD device in which the common lines are formed between the respective gate lines.

SUMMARY OF THE INVENTION

Accordingly, the present invention is directed to an LCD device and a method for manufacturing the same, which substantially obviate one or more problems due to limitations and disadvantages of the related art.

An advantage of the present invention is to provide a TFT substrate for inspection and an inspection method using the same in which shorts between gate lines and common lines are inspected using a shorting inspection bar and signal inspection bars, and in which signals are applied to a plurality of lines to inspect picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a TFT substrate for inspection of a liquid crystal display device according to the present invention includes a substrate defined by a display area and a non-display area outside the display area; a plurality of gate and data lines formed in the display area on the substrate, the gate lines formed to cross the data lines to define pixel regions; gate pad lines and data pad lines formed to be extended from one side of each of the gate and data lines to the non-display area; a plurality of common lines formed between adjacent gate lines; a plurality of gate and data signal inspection bars formed in the non-display area, the gate signal inspection bars formed to cross the data signal inspection bars at one side of each of the gate and data pad lines; transparent electrode patterns each connected to a respective one of the signal inspection bars and the gate pad lines; and a shorting inspection bar spaced apart from the gate signal inspection bars at a predetermined interval and connected to the gate pad lines.

In another aspect of the present invention, a TFT substrate for inspection includes a substrate defined by a display area and a non-display area outside the display area; a plurality of first and second lines formed in the display area on the substrate; pad lines formed to be extended from one side of each of the first lines to the non-display area; a plurality of signal inspection bars formed in the non-display area to cross the pad lines at one side of the pad lines; a shorting inspection bar spaced apart from the outermost signal inspection bar at a predetermined interval and substantially parallel with the signal inspection bar and connected to the pad lines; and a plurality of transparent electrode patterns partially overlapped with the pad lines and connected to one of the signal inspection bars.

In other aspect of the present invention, an inspection method using a TFT substrate includes a substrate defined by a display area and a non-display area outside the display area; a plurality of gate and data lines formed in the display area on the substrate, the gate lines formed to cross the data lines to define pixel regions; gate pad lines and data pad lines formed to be extended from one side of each of the gate and data lines to the non-display area; a plurality of common lines formed between adjacent gate lines; a plurality of gate and data signal inspection bars formed in the non-display area, the gate signal inspection bars formed to cross the data signal inspection bars at one side of each of the gate and data pad lines; transparent electrode patterns each connected to a respective one of the signal inspection bars and the gate pad lines; and a shorting inspection bar spaced apart from the gate signal inspection bars at a predetermined interval and connected to the gate pad lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
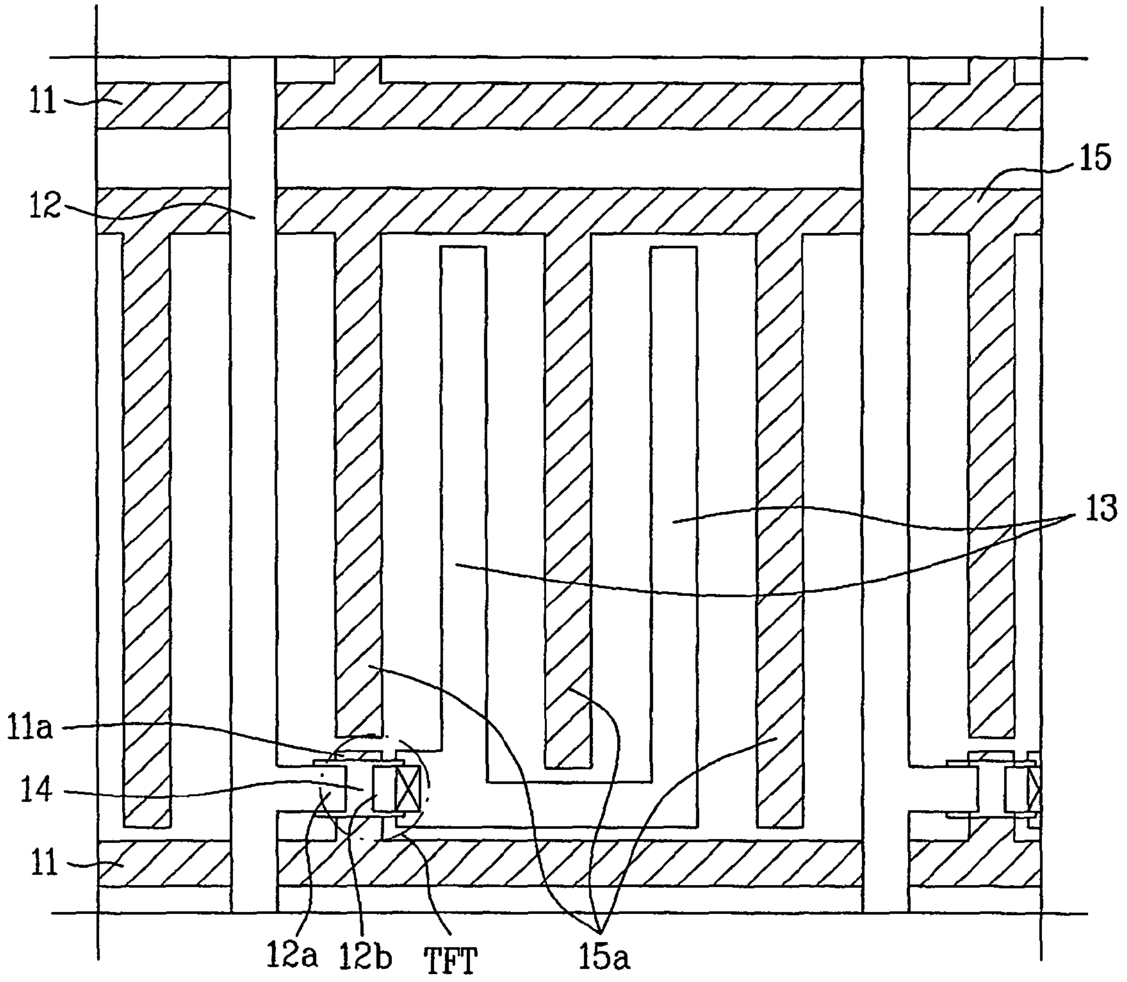
FIG. 1 is a plane view illustrating one pixel of a related art IPS mode LCD device.
Figure 2:
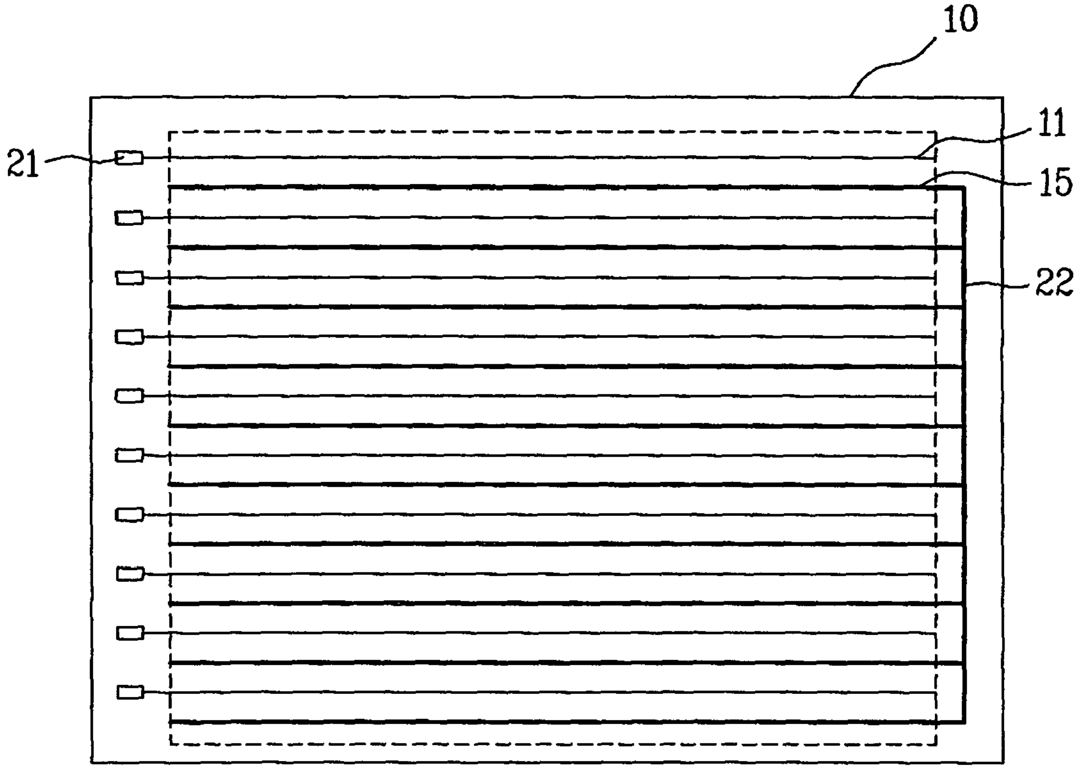
FIG. 2 is a plane view illustrating gate lines, common lines and signal applying sides of a related art IPS mode LCD device.
Figure 3A:
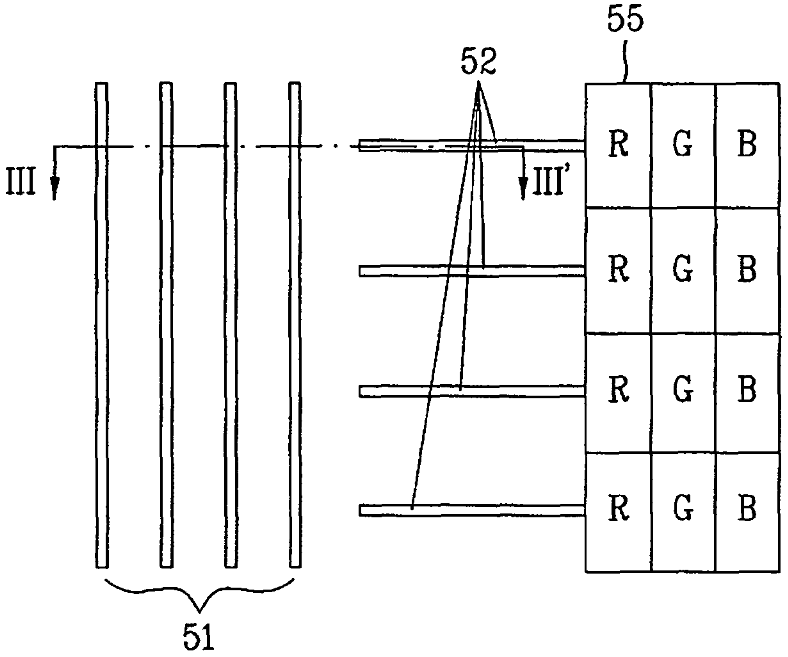
FIGS. 3A and 3B are plane views illustrating a plurality of shorting bars for inspecting picture quality of an LCD device and a contact between each shorting bar and gate pad lines.
Figure 3B:
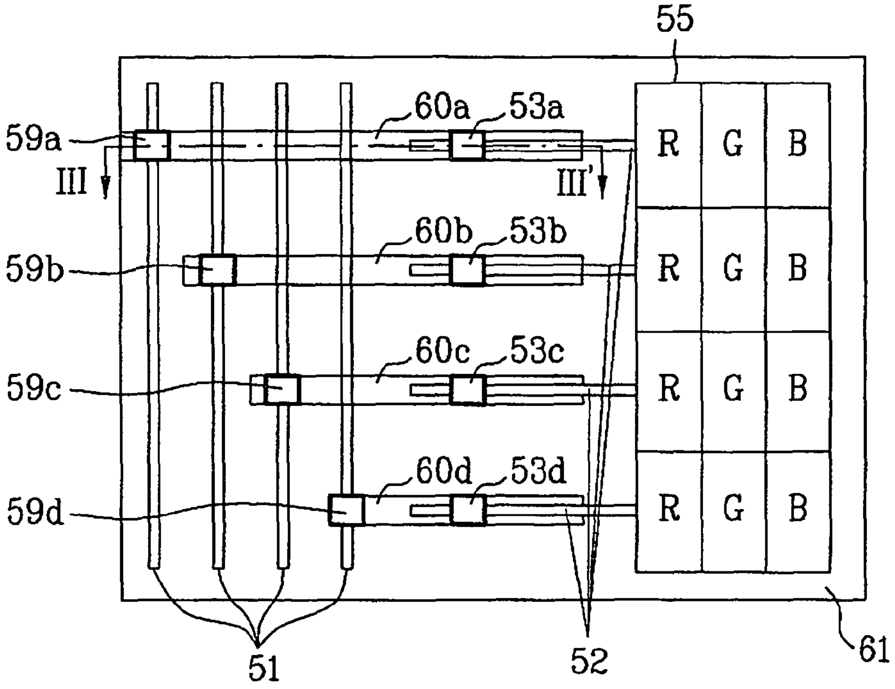
Figure 4A:
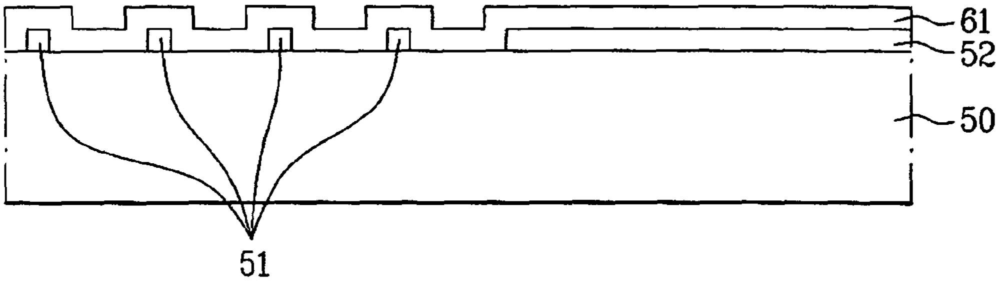
FIGS. 4A and 4B are structural sectional views taken along line III~III' of a first gate pad line shown in FIGS. 3A and 3B.
Figure 4B:
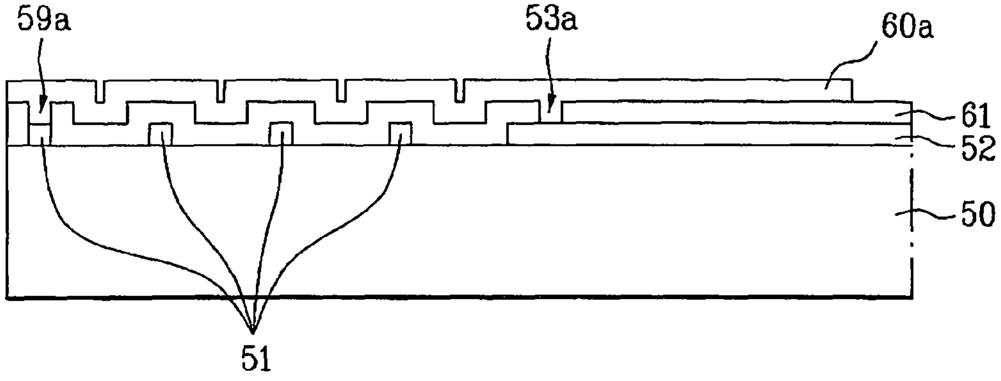

FIGS. 3A and 3B are plane views illustrating a plurality of shorting bars for inspecting picture quality of an LCD device and a contact between each shorting bar and a respective gate pad line, and FIGS. 4A and 4B are structural sectional views taken along line III~III' of a first gate pad line shown in FIGS. 3A and 3B.

The LCD device includes a first substrate provided with a TFT array; a second substrate provided with a color filter array; and a liquid crystal layer formed between the first and second substrate. The first and second substrates are defined by a display area and a non-display area outside the display area.

First to fourth shorting bars and a structure for connecting the shorting bars with gate pad lines are formed during the formation of the array.

A portion of the display area, a portion of the display area on the first substrate, and the non-display area near the display area are shown in FIG. 3A and FIG. 4A.

In the illustrated LCD device, gate pad lines 52 are formed on a substrate 50 and extend from a display area 55, and first to fourth shorting bars 51 are formed at a predetermined interval from the respective gate pad lines 52. The first to fourth shorting bars 51 are formed at constant intervals to cross the gate pad lines 52. The first to fourth shorting bars 51 and the gate pad lines 52 are formed during the patterning process for the gate lines. The gate pad lines 52 are extended from the gate lines and are formed integrally with the gate lines.

Subsequently, a gate insulating layer 61 is formed on the substrate 50 including the gate pad lines 52 and the first to fourth shorting bars 51.

As shown in FIGS. 3B and 4B, a portion of the gate insulating layer is selectively removed to form first to fourth contact holes 59*a*, 59*b*, 59*c* and 59*d* and gate pad contact holes 53*a*, 53*b*, 53*c* and 53*d*. The first to fourth contact holes 59*a*, 59*b*, 59*c* and 59*d* expose the first to fourth shorting bars 51 on portions parallel with the corresponding gate pad lines 52 while the gate pad contact holes 53*a*, 53*b*, 53*c* and 53*d* partially expose the corresponding gate pad lines 52.

The first to fourth contact holes 59*a*, 59*b*, 59*c* and 59*d* and the gate pad contact holes 53*a*, 53*b*, 53*c* and 53*d* are covered by a transparent electrode material deposited on the entire surface of the gate insulating layer 61. Portions of the transparent electrode material are selectively removed to form transparent electrode patterns 60*a* connected to the respective gate pad lines 52 and the corresponding shorting bars 51. The transparent electrode patterns 60*a* may be formed during formation of pixel electrodes within the display area.

Once the TFT array of the above described LCD device array is formed, voltage signals may be respectively applied to the first to fourth shorting bars 51, and by detecting voltage values at the gate lines opposite the side to which the voltage signals applied or by viewing display errors on the display screen, an inspection for shorts between the gate lines may be conducted. An additional four shorting bars or a plurality of shorting bars corresponding to the data lines may be provided to inspecting for shorts between the data lines.

However, while the aforementioned structure allows an inspection for shorts between the gate lines or the data lines the structure is not effective to detect shorts between the gate lines and the common lines arranged between adjacent gate lines in the IPS mode LCD device.

Hereinafter, an LCD device according to an embodiment of the present invention will be described supporting an inspection to detect shorts between the gate line and the common line.

FIGS. 5A to 5D are plane views illustrating a process for manufacturing an LCD device according to the present invention, FIGS. 6A to 6D are structural sectional views taken along line I~I' shown in FIGS. 5A to 5D, and FIGS. 7A to 7D are structural sectional views taken along line II~II' shown in FIGS. 5A to 5D.

An LCD device according to an embodiment of the present invention includes a first substrate provided with a TFT array; a second substrate provided with a color filter array; and a liquid crystal layer formed between the first and second substrate. A display area and a non-display area outside the display area are defined on the first and second substrates.

Figure 5A:
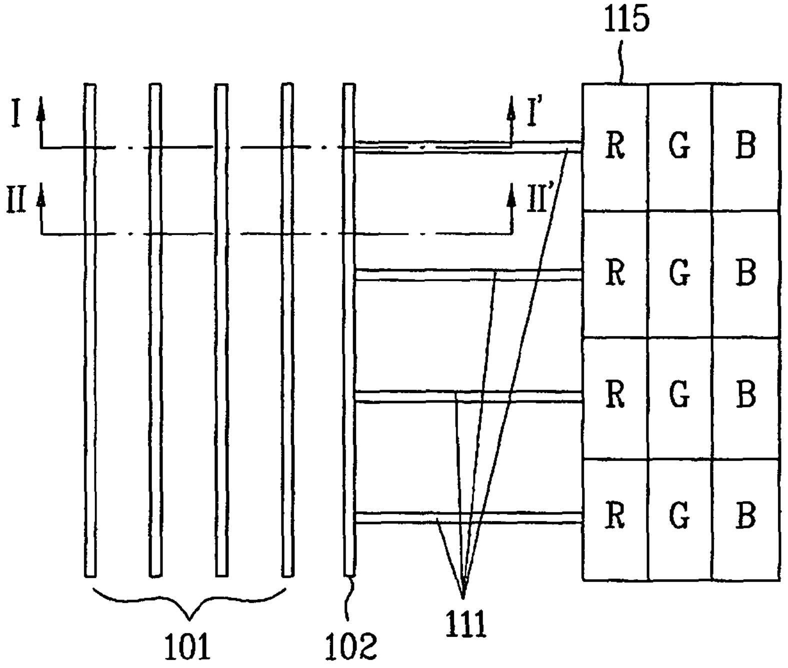
FIGS. 5A to 5D are plane views illustrating process steps for manufacturing an LCD device according to an embodiment of the present invention.
Figure 6A:
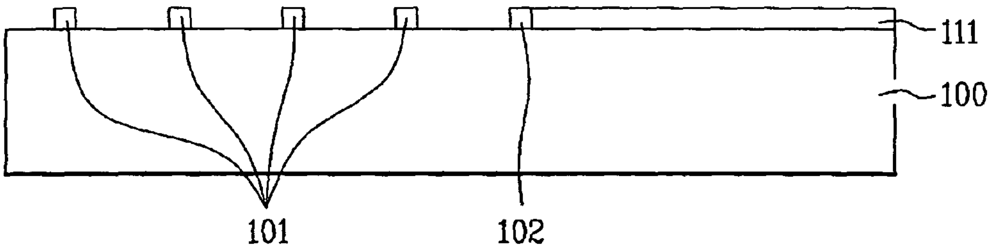
FIGS. 6A to 6D are structural sectional views taken along line I~I' shown in FIGS. 5A to 5D.
Figure 7A:
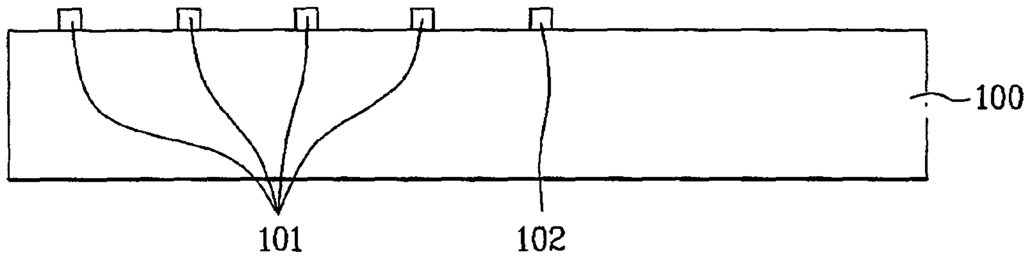
FIGS. 7A to 7D are structural sectional views taken along line II~II' shown in FIGS. 5A to 5D.

As shown in FIGS. 5A, 6A and 7A, gate pad lines 111, two or more signal inspection bars 101 and a shorting inspection bar 102 are formed on the TFT substrate for performing an inspection during the process of forming gate lines of a display area 115. The gate pad lines 111 are formed in the non-display area and extend from the gate lines. The signal inspection bars 101 and the shorting inspection bar 102 are formed to be substantially perpendicular to the gate pad lines 111 and are spaced apart from one another at constant intervals. The shorting inspection bar 102 may be spaced apart from the signal inspection bars 101 at a predetermined interval different from the interval between the respective signal inspection bars 101. The shorting inspection bar 102 is connected to the gate pad lines 111.

When voltages are applied to the shorting inspection bar 102, voltage values are measured out from the gate lines at the other side to which the shorting inspection bar 102 is connected. The measured voltage values are compared with the applied voltages to detect shorts between the gate lines and the common lines formed in the display area 115. When a short is present, a voltage value different from the applied voltage is measured on the gate line on which a short is present. The portion where short occurs may partially be repaired, or a rework process may be performed if sufficiently serious short occurs.

Figure 5B:
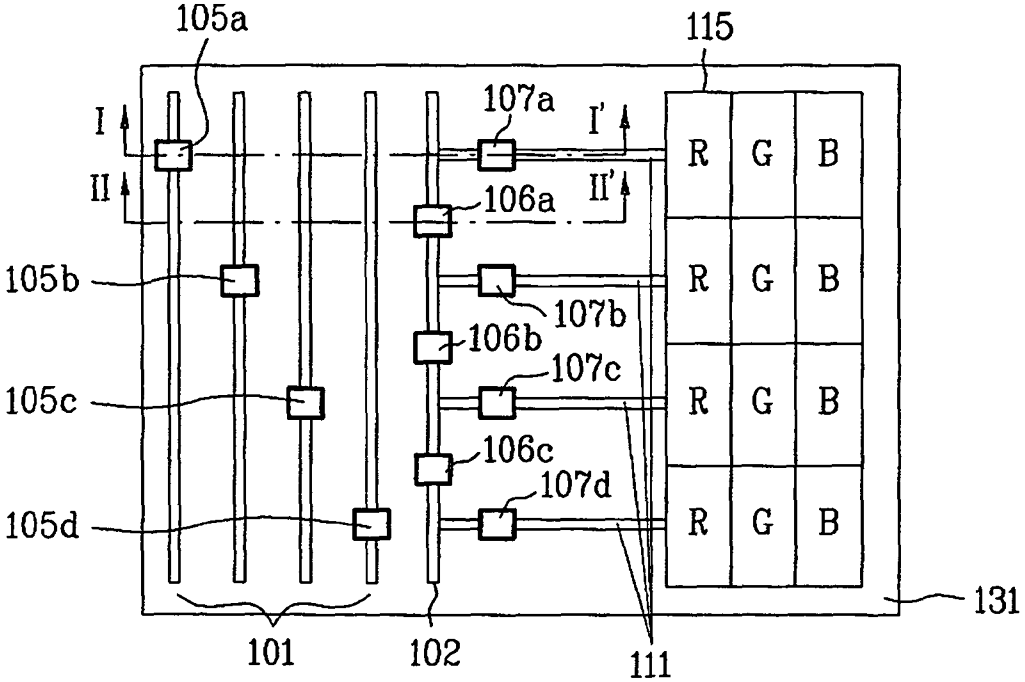
Figure 6B:
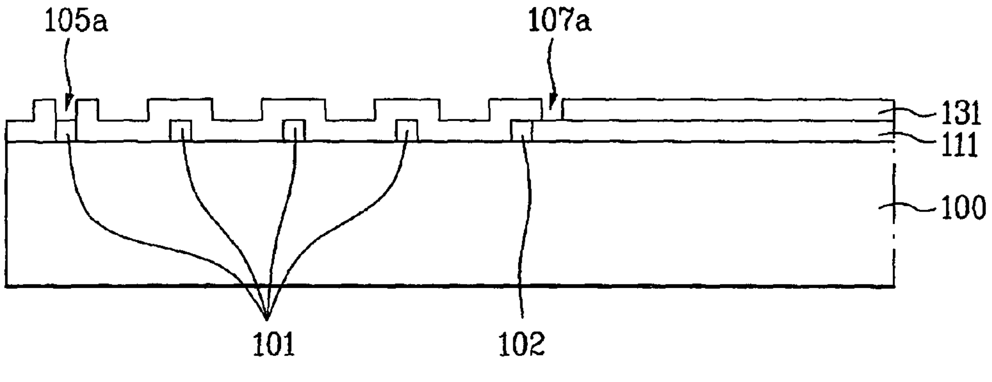
Figure 7B:
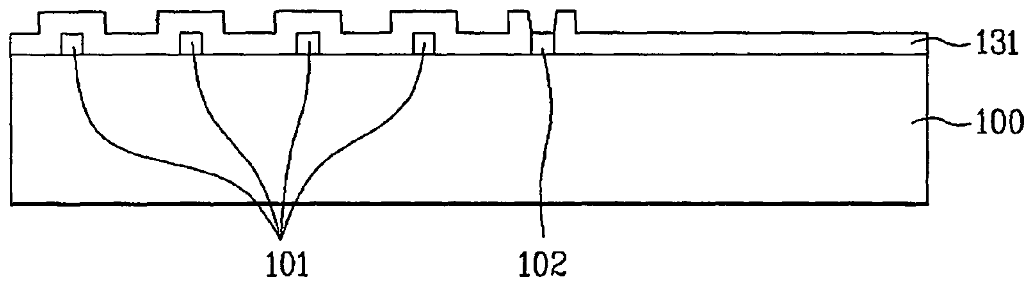

As shown in FIGS. 5B, 6B and 7B, a gate insulating layer 131 is formed on the entire surface of a first substrate 100 including the gate pad lines 111, the signal inspection bars 101 and the shorting inspection bar 102. Portions of the gate insulating layer 131 are then selectively removed to form gate pad contact holes 107*a*, 107*b*, 107*c* and 107*d* and signal inspection contact holes 105*a*, 105*b*, 105*c* and 105*d*. The gate pad contact holes 107*a*, 107*b*, 107*c* and 107*d* partially expose the gate. pad lines while the signal inspection contact holes 105*a*, 105*b*, 105*c* and 105*d* expose the signal inspection bars 101 on portions parallel with the corresponding gate pad lines. Shorting bar cutting holes 106*a*, 106*b*, 106*c* and 106*d* are formed to open a predetermined portion (the portion between adjacent gate pad lines) of the shorting inspection bar 102. A passivation layer may be further formed on the gate insulating layer 131 and then removed during the process of forming the contact holes. The passivation layer may be formed after the data lines of the display area 115 are formed. If the passivation layer is formed prior to forming the contact holes, the contact holes are formed by simultaneously removing portions of the passivation layer and the gate insulating layer 131.

Figure 5C:
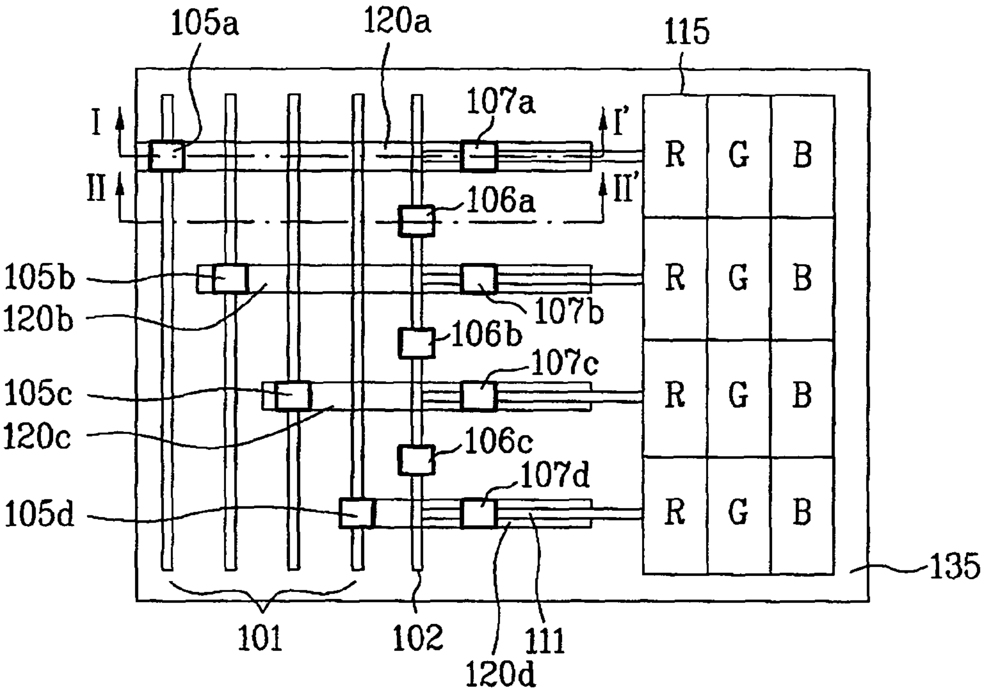
Figure 6C:
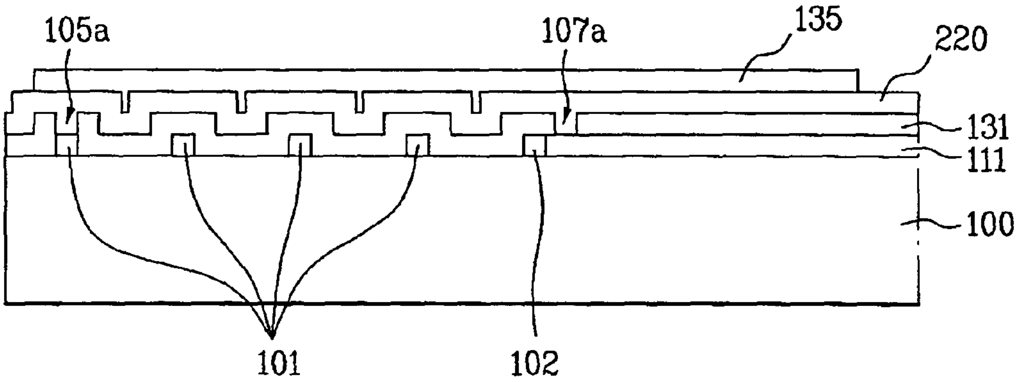
Figure 7C:
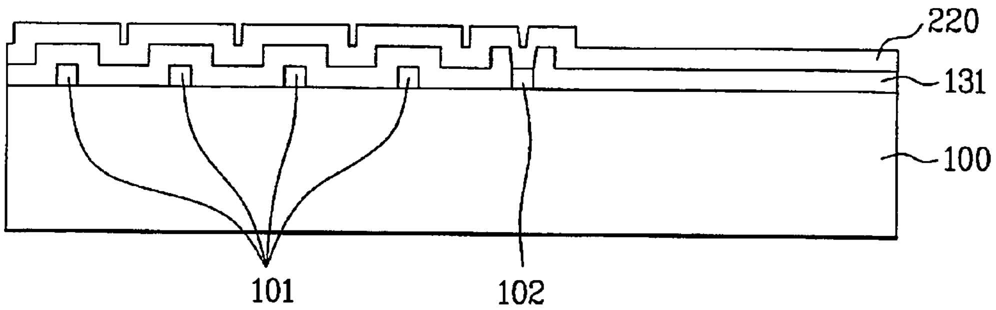

Subsequently, as shown in FIGS. 5C, 6C and 7C, a transparent electrode 220 is deposited covering the signal inspection contact holes 105*a*, 105*b*, 105*c* and 105*d* and the gate pad contact holes 107*a*, 107*b*, 107*c* and 107*d*. A photoresist layer is coated on the transparent electrode 220 and then selectively exposed and developed to form a photoresist pattern 135. The transparent electrode is selectively patterned using the photoresist pattern as a mask to form transparent electrode patterns 120*a*, 120*b*, 120*c* and 120*d*. The photoresist pattern is formed to overlap with the signal inspection bars each connected to the corresponding gate pad lines, wherein each signal inspection bar corresponds to one of the four gate pad lines.

Figure 5D:
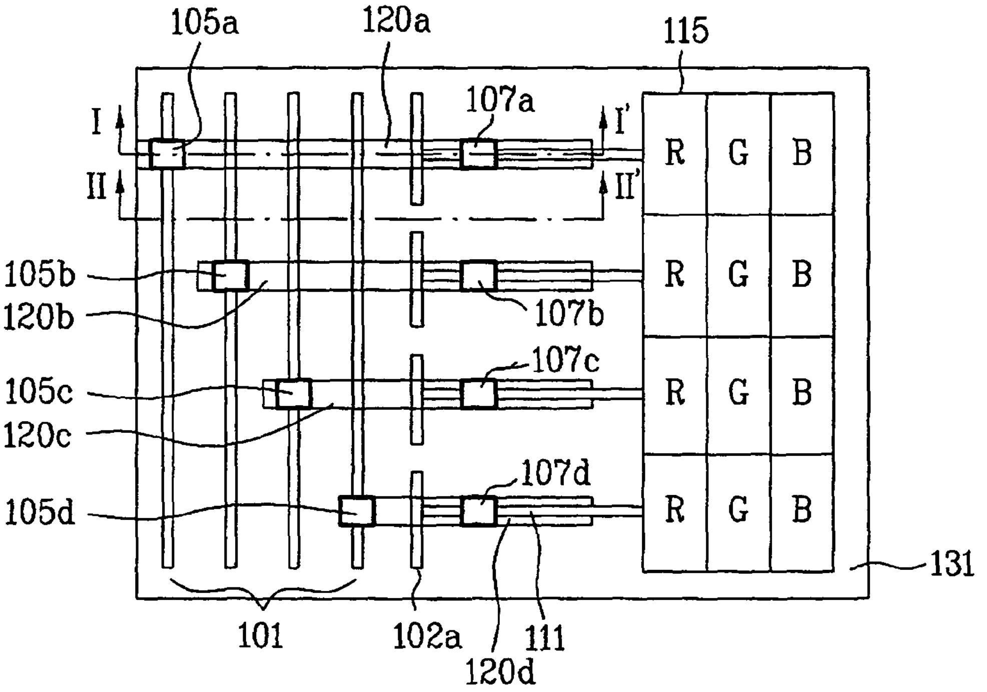
Figure 6D:
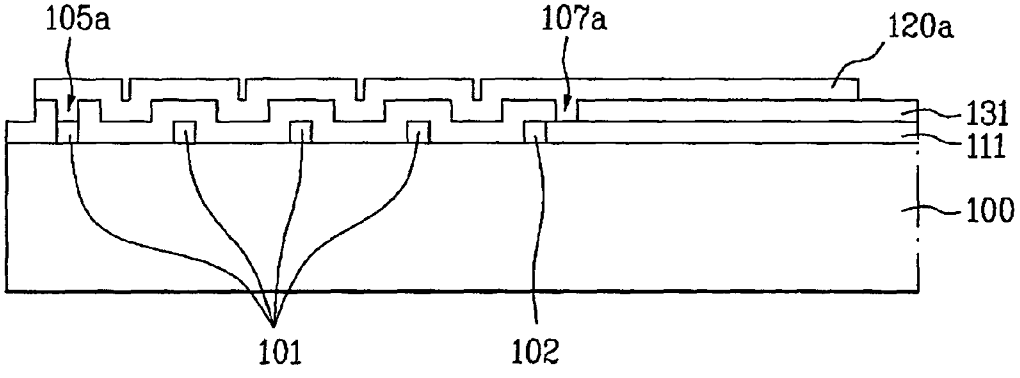
Figure 7D:
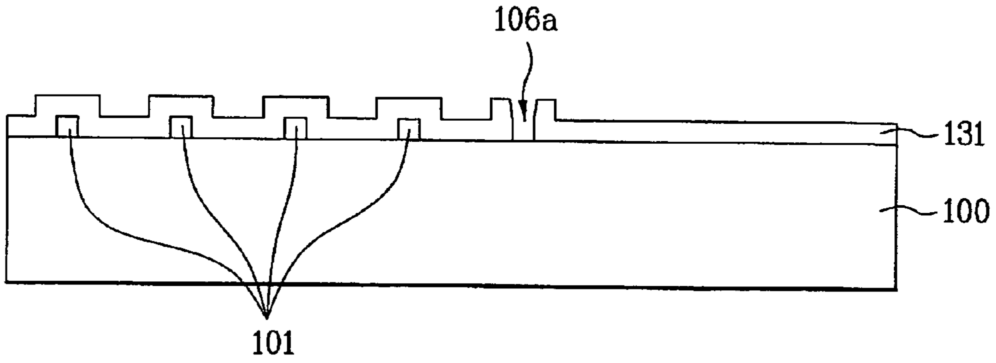

As shown in FIGS. 5D, 6D and 7D, portions of the shorting bar 102 in contact with the transparent electrode patterns 120*a*, 120*b*, 120*c* and 120*d* that are not covered by the photoresist pattern 135 are removed from the shorting inspection bar 102 during the process of patterning the transparent electrode. As a result, the shorting inspection patterns 102*a* are formed.

After forming the shorting inspection patterns 102*a*, the gate pad lines 111 are no longer connected by the single shorting inspection bar 102, but are independently connected to respective shorting inspection patterns 102*a*. Each one of the four signal inspection bars 101 corresponds to each gate pad line 111 so that each gate pad line 111 may be independently applied with a signal. As described above, the shorting inspection bar 102 is cut into the shorting inspection patterns 102*a* to independently apply a separate signal according to each signal inspection bar 101 to each; gate pad line.

The transparent electrode patterns 120*a*, 120*b*, 120*c* and 120*d* may be formed during the process of forming pixel electrodes of the display area.

Although the contact structure between the outermost signal inspection bar and the corresponding gate pad line has been described, the described contact structure may be applied between the other signal inspection bars and the corresponding gate pad lines. In other words, the portions of the signal inspection bars parallel with the corresponding gate pad lines will be formed with the contact holes.

The signal inspection bars 101 respectively correspond to each gate pad line. Although four signal inspection bars 101 have been described, two or more signal inspection bars may be used.

The aforementioned structure and the inspection method, in which the plurality of signal inspection bars are formed at one side of the gate lines and different voltage signals are applied to the respective signal inspection bars to inspect shorts through the voltage values measured at the other side of the gate lines, may be applied to inspect the data lines. When the aforementioned structure and the inspection method are applied to the data lines, an inspection structure for detecting for shorts between data lines and common lines may be omitted. Therefore, when using the structure illustrated in FIGS. 3A to 4D, the data lines may be inspected for shorts by forming the a plurality of signal inspection bars and the forming of short inspection bars for the data lines may be omitted.

In addition to inspecting for shorts between the gate lines and the common lines, picture quality may be inspected by applying different signals to the gate lines to identify the driving state of the TFT after the TFT array is formed. In other words, after the process illustrated in FIG. 5D is completed, the TFT array is formed in the display area 115. The TFT array includes gate and data lines crossing each other to define a pixel region; a TFT formed at a crossing portion of the gate and data lines; and a pixel electrode formed in the pixel region. Various voltage signals may be applied to the signal inspection bars connected to the gate pad lines. In addition, a plurality of signal inspection bars may be provided at pads of the data lines in the same manner as the structure of FIGS. 3A to 4D, and a predetermined voltage signal may be applied to each data line inspection bar to identify an error at a corresponding pixel by examining the lighting state of the pixel.

The shorting inspection bar structure allows inspecting for shorts in an LCD device having relatively narrow separation between signal lines, including for example, an LCD having closely spaced common lines and gate lines.

As described above, the TFT substrate for inspection and the inspection method using the same according to the present invention have the following advantages.

Since the shorting inspection bar is separately provided in parallel with the gate lines in addition to the signal inspection bars, it is possible to inspect for shorts between the gate lines and the common lines after forming the gate lines and before the array process is completely performed. Therefore, it is possible to facilitate a repair or rework process for handling a relatively high frequency of occurrence of shorts such as the shorts associated with a narrow spacing between the gate lines and the common line.

In addition, since a plurality of signal inspection lines is provided, it is possible to inspect shorts between the gate lines or the data lines and to detect errors in each pixel by applying a predetermined voltage signal to each signal inspection line after the array process is complete.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An inspection method using a TFT substrate comprising:

preparing a substrate defined by a display area and a non-display area outside the display area;

depositing a metal on an entire surface of the substrate and selectively removing the metal to form gate lines and common lines in the display area of the substrate, pad lines extended from the gate lines to the non-display area, a shorting inspection bar connected to the pad lines to cross the pad lines, and a plurality of signal inspection bars spaced apart from the shorting inspection bar at a predetermined interval and substantially parallel with the shorting inspection bar, wherein the common lines, the pad lines are substantially parallel with the gate lines and wherein the common lines are disposed between the gate lines;

inspecting short between the gate lines and the common lines by applying voltage signals to the shorting inspection bar;

depositing an insulating layer on the entire surface of the substrate including the gate lines, the common lines, the pad lines, the shorting inspection bar and the signal inspection bars;

forming pad line contact holes, signal inspection bar contact holes, and shorting bar cutting holes by selectively removing the insulating layer;

burying the pad line contact holes, the signal inspection bar contact holes, and the shorting bar cutting holes to deposit a transparent electrode on an entire surface of the insulating layer; and forming transparent electrode patterns by selectively removing the transparent electrode to connect the pad lines with the one of the signal inspection bars, and forming shorting bar patterns by removing the transparent electrode on the shorting bar cutting holes and the shorting inspection bar below the shorting bar cutting holes.

2. The inspection method as claimed in claim 1, further comprising inspecting for errors in the gate lines in the display area by applying voltage signals to the respective signal inspection bars after forming the shorting bar patterns.

3. The inspection method as claimed in claim 1, further comprising forming data lines in the display area in a direction substantially perpendicular to the gate lines, after depositing the insulating layer.

4. A method for manufacturing a liquid crystal display device comprising:

preparing a first substrate a second substrate;

forming a liquid crystal layer between the first and second substrates;

wherein preparing the first substrate comprises:

defining a display area and a non-display area outside the display area on the first substrate;

depositing a metal on an entire surface of the first substrate and selectively removing the metal to from gate and common lines in the display area of the first substrate pad lines extended from the gate lines to the non-display area, a shorting inspection bar connected to the pad lines to cross the pad lines, and a plurality of signal inspection bars spaced apart from the shorting inspection bar at a predetermined interval and substantially parallel with the shorting inspection bar, wherein the common lines, the pad lines are substantially parallel with the gate lines and wherein the common lines are disposed between the gate lines;

inspecting short between the gate lines and the common lines by applying voltage signals to the shorting inspection bar;

depositing an insulating layer on the entire surface of the first substrate including the gate lines, the common lines, the pad lines, the shorting inspection bar and the signal inspection bars;

forming pad line contact holes, signal inspection bar contact holes, and shorting bar cutting holes by selectively removing the insulating layer;

burying the pad line contact holes, the signal inspection bar contact holes, and the shorting bar cutting holes to deposit a transparent electrode on an entire surface of the insulating layer; and forming transparent electrode patterns by selectively removing the transparent electrode to connect the pad lines with the one of the signal inspection bars, and forming shorting bar patterns by removing the transparent electrode on the shorting bar cutting holes and the shorting inspection bar below the shorting bar cutting holes.

5. The manufacturing method as claimed in claim 4, further comprising inspecting for errors of the gate lines in the display area by applying voltage signals to the respective signal inspection bars, after forming the shorting bar patterns.

6. The manufacturing method as claimed in claim 4, further comprising forming data lines in the display area in a direction substantially perpendicular to the gate lines, after depositing the insulating layer.

* * * * *